US012619760B2

(12) United States Patent
Vorobyov et al.

(10) Patent No.: US 12,619,760 B2
(45) Date of Patent: May 5, 2026

(54) COMPOSITIONAL REASONING OF INFORMATION FLOW IN SCRIPTED QUERY LANGUAGE

(71) Applicant: Oracle International Corporation, Redwood Shores, CA (US)

(72) Inventors: Kostyantyn Vorobyov, Brisbane (AU); Padmanabhan Krishnan, Brisbane (AU); François Gauthier, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 18/492,740

(22) Filed: Oct. 23, 2023

(65) Prior Publication Data

US 2025/0131120 A1    Apr. 24, 2025

(51) Int. Cl.
*G06F 21/00*        (2013.01)
*G06F 16/22*        (2019.01)
*G06F 21/62*        (2013.01)

(52) U.S. Cl.
CPC ...... *G06F 21/6227* (2013.01); *G06F 16/2246* (2019.01); *G06F 2221/2141* (2013.01)

(58) Field of Classification Search
None
See application file for complete search history.

(56) References Cited

U.S. PATENT DOCUMENTS 6,226,637 B1 *   5/2001   Carey ................. G06F 16/2438
7,661,141 B2 *   2/2010   Dutta ................. G06F 21/6227
                                                          707/693

8,078,595 B2 *   12/2011   King ................... G06F 21/6227
                                                          707/694
8,250,048 B2 *   8/2012   Yalamanchi ........ G06F 16/9024
                                                          707/705
8,566,906 B2 *   10/2013   Gross ...................... H04L 63/10
                                                          713/168
8,661,499 B2 *   2/2014   Natarajan ........... G06F 21/6218
                                                          726/1
8,875,224 B2 *   10/2014   Gross ...................... H04L 63/20
                                                          726/1

(Continued)

OTHER PUBLICATIONS

Shumo Chu, Konstantin Weitz, Alvin Cheung, and Dan Suciu. Hottsql: Proving query rewrites with univalent sql semantics. In PLDI, pp. 510-524, Jun. 1, 2017, 15 pages.

(Continued)

*Primary Examiner* — Maung T Lwin

(74) *Attorney, Agent, or Firm* — Lathrop GPM LLP

(57)    ABSTRACT

A method implements compositional reasoning of information flow in scripted query language. The method includes gating access to a database using a policy that includes a policy scope defined by a set of policy tuples extracted from a set of policy queries. The method further includes preventing execution of a runtime query requesting access to the database. The method further includes extracting a set of runtime tuples from the runtime query and comparing the set of runtime tuples to the set of policy tuples to form an access determination identifying a runtime scope of the runtime query being within the policy scope of the policy. The method further includes executing the runtime query in response to the access determination.

18 Claims, 8 Drawing Sheets

(56) References Cited

U.S. PATENT DOCUMENTS

| | | | | | |
|---|---|---|---|---|---|
| 8,959,629 | B2 * | 2/2015 | Scholte | H04L 63/1483 | |
| | | | | 726/22 | |
| 9,811,322 | B1 * | 11/2017 | Sindelar | G06F 8/433 | |
| 9,904,898 | B2 * | 2/2018 | Addala | G06Q 10/06393 | |
| 10,645,090 | B2 * | 5/2020 | Vadapandeshwara | | |
| | | | | H04L 63/104 | |
| 11,755,827 | B2 * | 9/2023 | Haramati | G06F 18/22 | |
| | | | | 707/781 | |
| 2007/0136291 | A1 * | 6/2007 | Bird | G06F 21/6227 | |
| | | | | 707/999.009 | |
| 2015/0317486 | A1 * | 11/2015 | Muller | G06F 21/6227 | |
| | | | | 726/28 | |
| 2015/0334122 | A1 * | 11/2015 | Austin | G06F 21/12 | |
| | | | | 726/1 | |
| 2016/0342628 | A1 * | 11/2016 | Van Rest | G06F 16/835 | |
| 2020/0074107 | A1 * | 3/2020 | Barbas | G06F 16/24564 | |
| 2022/0215020 | A1 * | 7/2022 | Vanhooser | G06F 16/24573 | |

OTHER PUBLICATIONS

Isil Dillig, Thomas Dillig, Alex Aiken, and Mooly Sagiv. Precise and compact modular procedure summaries for heap manipulating programs. In PLDI, pp. 567-577, Jun. 1, 2011, 12 pages.

Catarina Gamboa, Paulo Santos, Christopher Steven Timperley, and Alcides Fonseca. Usability-oriented design of liquid types for java. In ICSE, Jan. 1, 2021, 13 pages.

Patrice Godefroid, Aditya V. Nori, Sriram K. Rajamani, and Sai Deep Tetali. Compositional may-must program analysis: Unleashing the power of alternation. In POPL. ACM, Jul. 15, 2009, 13 pages.

Angshuman Jana, Raju Halder, Kalahasti Venkata Abhishekh, Sanjeevini Devi Ganni, and Agostino Cortesi. Extending abstract interpretation to dependency analysis of database applications. IEEE Trans. Software Eng., 46(5):463-494, May 1, 2020, 33 pages.

Oleg Kiselyov and Tatsuya Katsushima. Sound and efficient language-integrated query maintaining the order. In APLAS, Nov. 27, 2017, 20 pages.

Yingjun Lyu, Sasha Volokh, William G. J. Halfond, and Omer Tripp. SAND: a static analysis approach for detecting sql antipatterns. In ISSTA. ACM, Jul. 11-17, 2021, 13 pages.

James Parker, Niki Vazou, and Michael Hicks. Lweb: Information flow security for multi-tier web applications. In POPL. ACM, Jan. 23, 2019, 30 pages.

Patrick M. Rondon, Ming Kawaguchi, and Ranjit Jhala. Liquid types. In PLDI. ACM, Jun. 1, 2008, 11 pages.

Andrei Sabelfeld and Andrew C. Myers. Language-based information-flow security. IEEE Journal on Selected Areas in Communications, 21, Jan. 1, 2003, 15 pages.

Q. Sti'evenart and C. De Roover. Compositional information flow analysis for webassembly programs. In SCAM, pp. 13-24, Jan. 1, 2020, 12 pages.

Q. Sti'evenart, M. Vandercammen, W. De Meuter, and C. De Roover. Scala-am: A modular static analysis framework. In SCAM, pp. 85-90, Sep. 27, 2016, 6 pages.

* cited by examiner

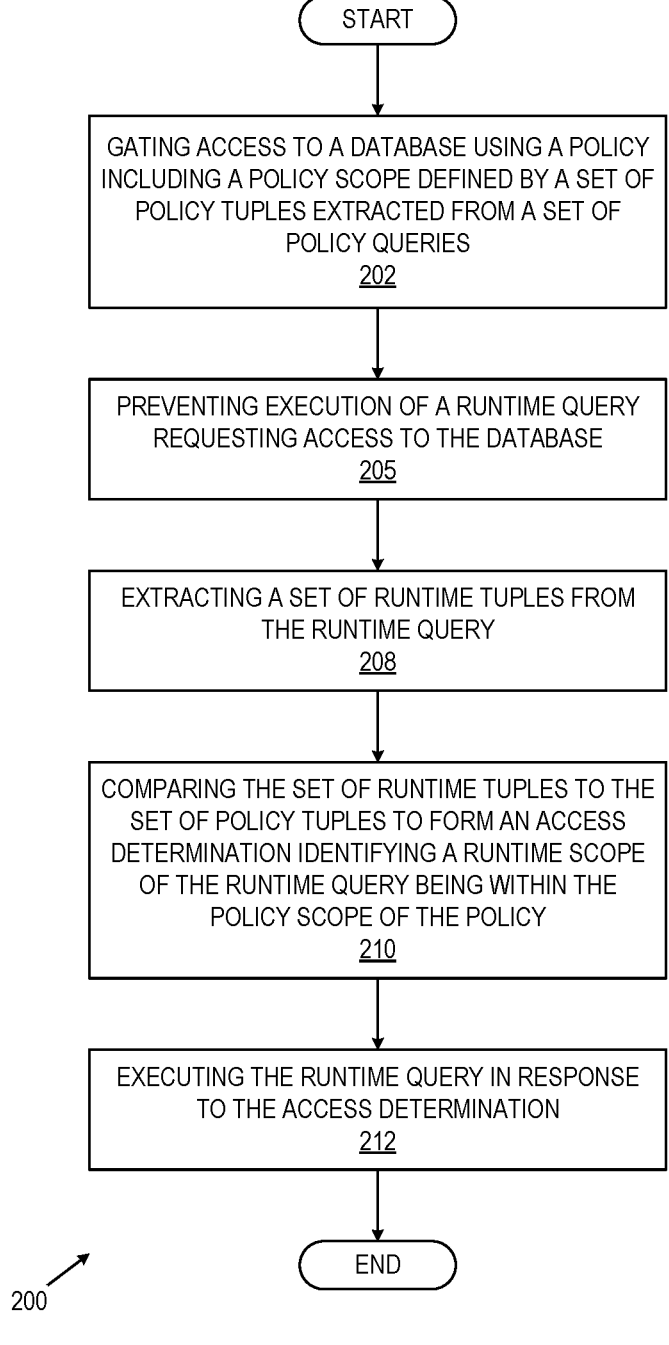

START

GATING ACCESS TO A DATABASE USING A POLICY
INCLUDING A POLICY SCOPE DEFINED BY A SET OF
POLICY TUPLES EXTRACTED FROM A SET OF
POLICY QUERIES
202

PREVENTING EXECUTION OF A RUNTIME QUERY
REQUESTING ACCESS TO THE DATABASE
205

EXTRACTING A SET OF RUNTIME TUPLES FROM
THE RUNTIME QUERY
208

COMPARING THE SET OF RUNTIME TUPLES TO THE
SET OF POLICY TUPLES TO FORM AN ACCESS
DETERMINATION IDENTIFYING A RUNTIME SCOPE
OF THE RUNTIME QUERY BEING WITHIN THE
POLICY SCOPE OF THE POLICY
210

EXECUTING THE RUNTIME QUERY IN RESPONSE
TO THE ACCESS DETERMINATION
212

END

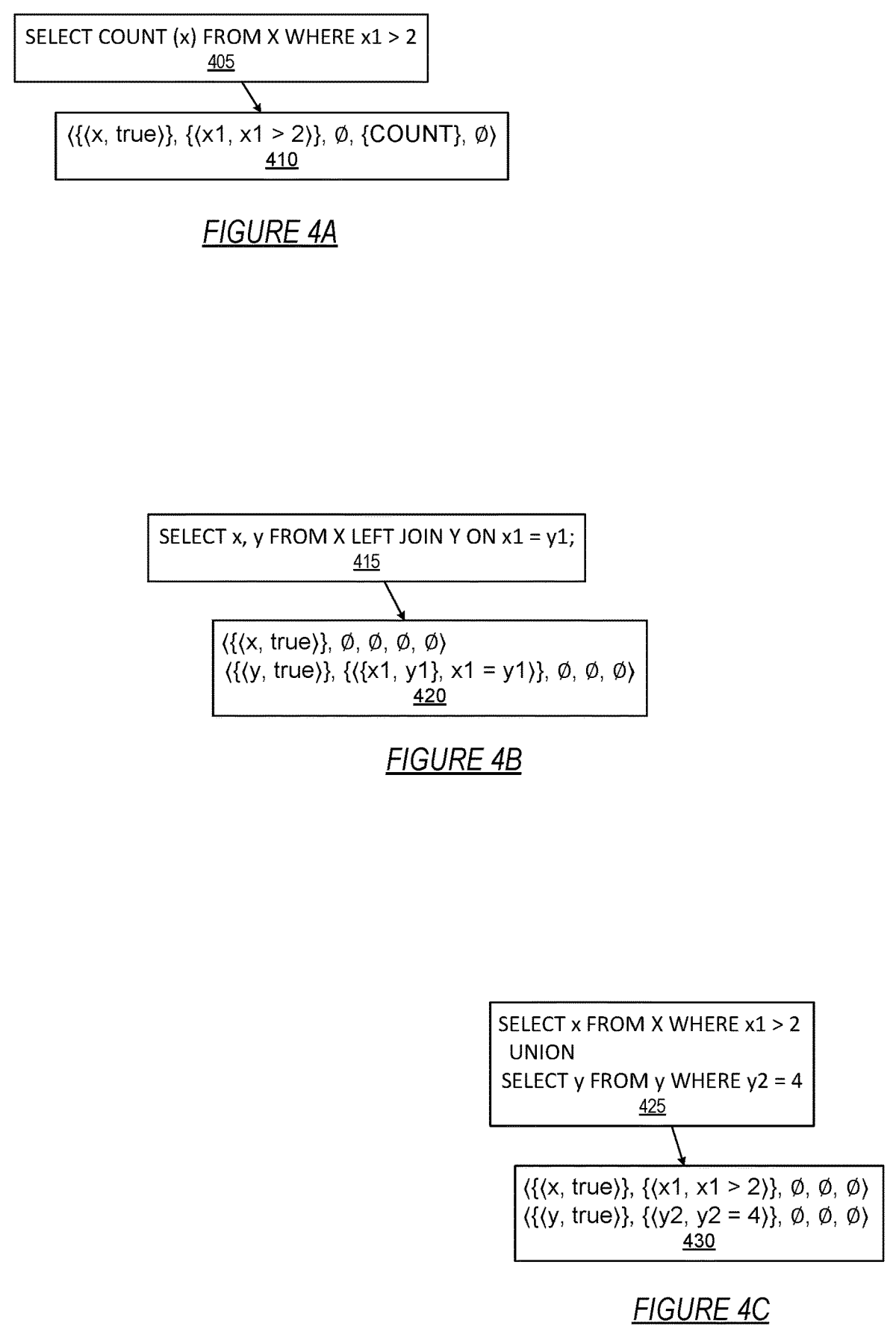

SELECT COUNT (x) FROM X WHERE x1 > 2
405

$\langle\{\langle x, true\rangle\}, \{\langle x1, x1 > 2\rangle\}, \emptyset, \{COUNT\}, \emptyset\rangle$
410

*FIGURE 4A*

SELECT x, y FROM X LEFT JOIN Y ON x1 = y1;
415

$\langle\{\langle x, true\rangle\}, \emptyset, \emptyset, \emptyset, \emptyset\rangle$
$\langle\{\langle y, true\rangle\}, \{\langle\{x1, y1\}, x1 = y1\rangle\}, \emptyset, \emptyset, \emptyset\rangle$
420

*FIGURE 4B*

SELECT x FROM X WHERE x1 > 2
 UNION
SELECT y FROM y WHERE y2 = 4
425

$\langle\{\langle x, true\rangle\}, \{\langle x1, x1 > 2\rangle\}, \emptyset, \emptyset, \emptyset\rangle$
$\langle\{\langle y, true\rangle\}, \{\langle y2, y2 = 4\rangle\}, \emptyset, \emptyset, \emptyset\rangle$
430

*FIGURE 4C*

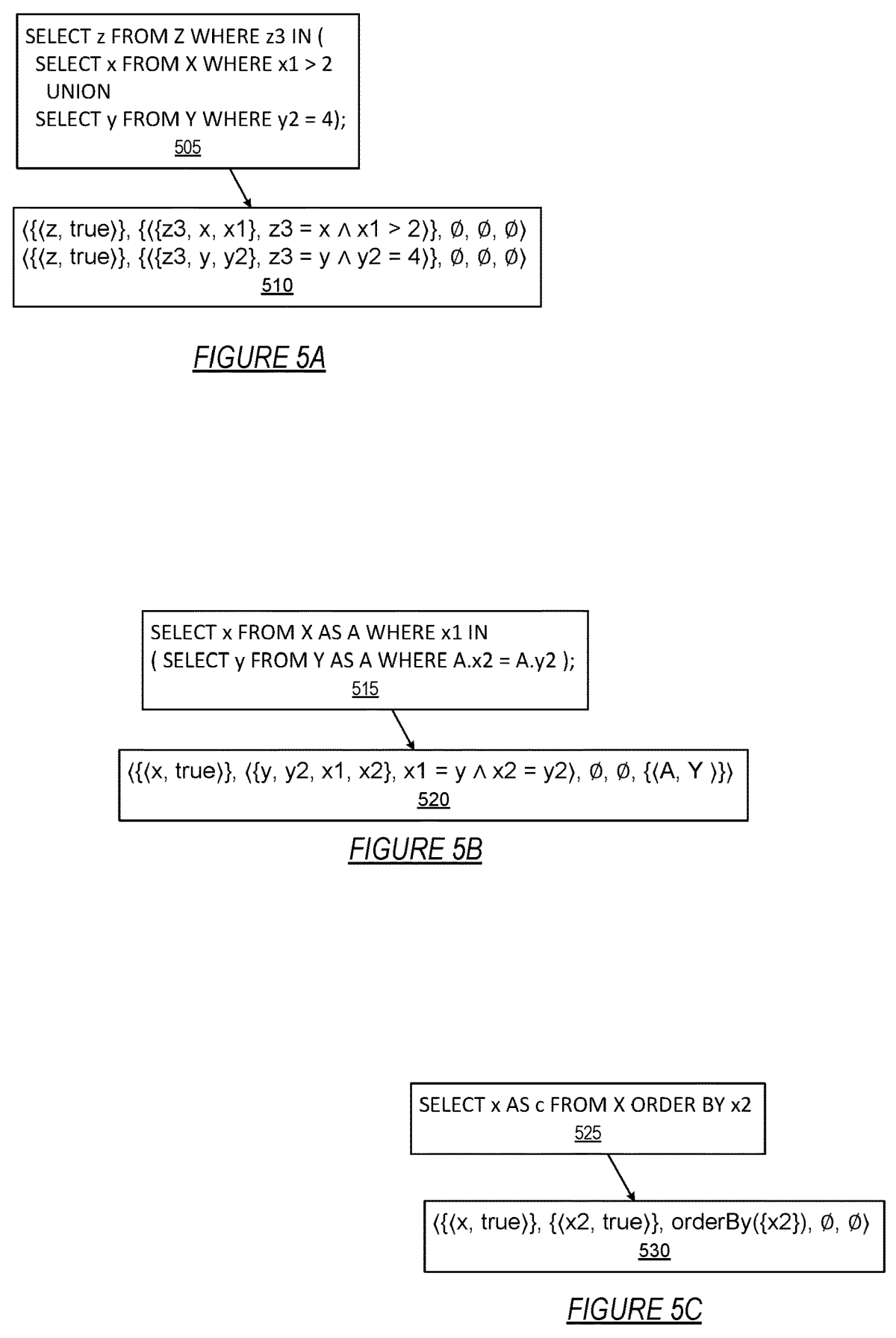

SELECT z FROM Z WHERE z3 IN (
  SELECT x FROM X WHERE x1 > 2
  UNION
SELECT y FROM Y WHERE y2 = 4);
<u>505</u>

$\langle\{\langle z, true\rangle\}, \{(\{z3, x, x1\}, z3 = x \wedge x1 > 2)\}, \emptyset, \emptyset, \emptyset\rangle$
$\langle\{\langle z, true\rangle\}, \{(\{z3, y, y2\}, z3 = y \wedge y2 = 4)\}, \emptyset, \emptyset, \emptyset\rangle$
<u>510</u>

*FIGURE 5A*

SELECT x FROM X AS A WHERE x1 IN
( SELECT y FROM Y AS A WHERE A.x2 = A.y2 );
<u>515</u>

$\langle\{\langle x, true\rangle\}, \langle\{y, y2, x1, x2\}, x1 = y \wedge x2 = y2), \emptyset, \emptyset, \{\langle A, Y\rangle\}\rangle$
<u>520</u>

*FIGURE 5B*

SELECT x AS c FROM X ORDER BY x2
<u>525</u>

$\langle\{\langle x, true\rangle\}, \{\langle x2, true\rangle\}, orderBy(\{x2\}), \emptyset, \emptyset\rangle$
<u>530</u>

*FIGURE 5C*

```
SELECT a, b, z FROM
  ( SELECT c AS a FROM
    ( SELECT x AS c FROM X ORDER BY x2 ))
    INNER JOIN
  ( SELECT d AS b FROM
    ( SELECT y AS d FROM Y))
    INNER JOIN
  Z
ORDER BY z1;
                        605
```

$\langle\{\langle x, true\rangle\}, \{\langle\{x, x2, z1\}, true\rangle\}, orderBy(z1), \emptyset, \{\langle c, x\rangle, \langle a, c\rangle, \langle d, y\rangle, \langle b, d\rangle\}\rangle$
$\langle\{\langle y, true\rangle\}, \{\langle\{y, z1\}, true\rangle\}, orderBy(z1), \emptyset, \{\langle c, x\rangle, \langle a, c\rangle, \langle d, y\rangle, \langle b, d\rangle\}\rangle$
$\langle\{\langle z, true\rangle\}, \{\langle\{z, z1\}, true\rangle\}, orderBy(z1), \emptyset, \{\langle c, x\rangle, \langle a, c\rangle, \langle d, y\rangle, \langle b, d\rangle\}\rangle$
                                    610

*FIGURE 6*

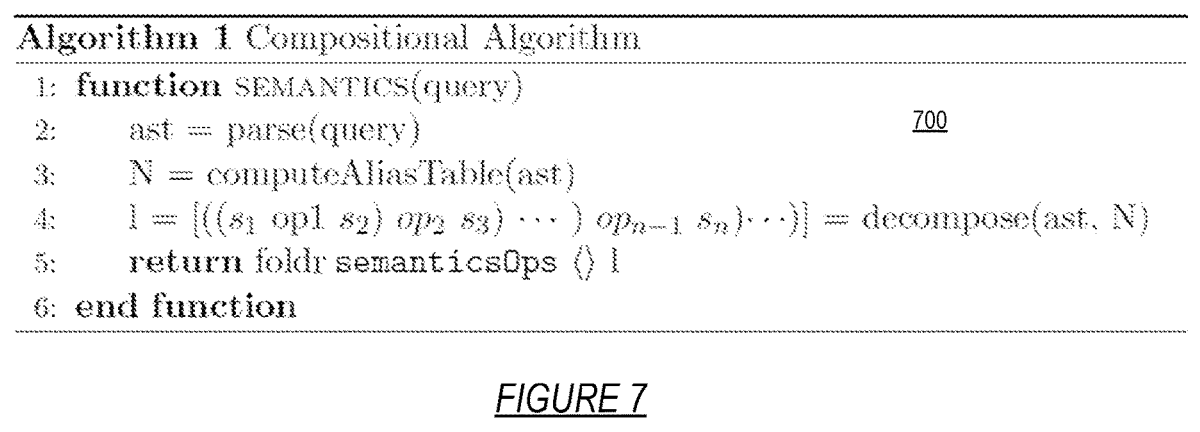

Algorithm 1 Compositional Algorithm

1: function SEMANTICS(query)
2:    ast = parse(query)                                                700
3:    N = computeAliasTable(ast)
4:    l = $[((s_1 \; op1 \; s_2) \; op_2 \; s_3) \cdots ) \; op_{n-1} \; s_n) \cdots)]$ = decompose(ast, N)
5:    return foldr semanticsOps () l
6: end function

*FIGURE 7*

800
COMPUTING
SYSTEM

808
OUTPUT DEVICE(S)

804
NON-PERSISTENT
STORAGE

802
COMPUTER
PROCESSOR(S)

806
PERSISTENT
STORAGE

812
COMMUNICATION
INTERFACE

810
INPUT DEVICE(S)

820
NETWORK

822
NODE X

824
NODE Y

826
CLIENT DEVICE

COMPOSITIONAL REASONING OF INFORMATION FLOW IN SCRIPTED QUERY LANGUAGE

BACKGROUND

Structured query language (SQL) queries are statements used in programming to interact with databases. The queries are employed to retrieve, manipulate, or manage data stored within a database system. The structured query language allows developers to communicate with databases using commands such as SELECT, INSERT, UPDATE, DELETE, etc., enabling tasks like fetching specific data, adding new records, modifying existing data, and removing entries.

Injection attacks pose a security concern within the realm of queries of databases. Injection attacks may occur when malicious actors exploit vulnerabilities in input fields of applications that use queries. By injecting specially crafted input, attackers can manipulate the structure of the queries to gain unauthorized access to a database, which can lead to unauthorized data retrieval, modification, deletion, etc., which may compromise the integrity and confidentiality of sensitive information. A challenge is to guard against injection attacks in manner that is seamless to users and administrators.

SUMMARY

In general, in one or more aspects, the disclosure relates to a method implementing compositional reasoning of information flow in scripted query language. The method includes gating access to a database using a policy that includes a policy scope defined by a set of policy tuples extracted from a set of policy queries. The method further includes preventing execution of a runtime query requesting access to the database. The method further includes extracting a set of runtime tuples from the runtime query and comparing the set of runtime tuples to the set of policy tuples to form an access determination identifying a runtime scope of the runtime query being within the policy scope of the policy. The method further includes executing the runtime query in response to the access determination.

In general, in one or more aspects, the disclosure relates to a system implementing compositional reasoning of information flow in scripted query language. The system includes at least one processor and an application executing on the at least one processor. The application performs gating access to a database using a policy that includes a policy scope defined by a set of policy tuples extracted from a set of policy queries. The application further performs preventing execution of a runtime query requesting access to the database. The application performs extracting a set of runtime tuples from the runtime query and comparing the set of runtime tuples to the set of policy tuples to form an access determination identifying a runtime scope of the runtime query being within the policy scope of the policy. The application performs executing the runtime query in response to the access determination.

In general, in one or more aspects, the disclosure relates to a non-transitory computer readable storage medium storing computer readable program code which, when executed by a processor, implements compositional reasoning of information flow in scripted query language. The program code performs gating access to a database using a policy that includes a policy scope defined by a set of policy tuples extracted from a set of policy queries. The program code performs preventing execution of a runtime query requesting access to the database. The program code performs extracting a set of runtime tuples from the runtime query. A runtime tuple, of the set of runtime tuples, includes one or more of a disclosed component, an accessed component, a syntactic component, a function component, and an alias component. The program code performs comparing the set of runtime tuples to the set of policy tuples to form an access determination identifying a runtime scope of the runtime query being within the policy scope of the policy. The program code performs executing the runtime query in response to the access determination.

Other aspects of the one or more embodiments will be apparent from the following description and the appended claims.

BRIEF DESCRIPTION OF DRAWINGS

FIG. 2 shows a method in accordance with one or more embodiments of the disclosure.

FIG. 3A, FIG. 3B, FIG. 4A, FIG. 4B, FIG. 4C, FIG. 5A, FIG. 5B, FIG. 5C, FIG. 6, and FIG. 7 show examples in accordance with one or more embodiments of the disclosure.

Like elements in the various figures are denoted by like reference numerals for consistency.

DETAILED DESCRIPTION

Embodiments of the disclosure use compositional reasoning of information flow to secure access to databases in a manner that is seamless to users and administrators. To restrict access to a database, a policy is created. An administrator may create a policy by providing example of queries (referred to as policy queries) that define the scope of what can and cannot be accessed from a database. The system extracts policy tuples from the policy queries in which the policy tuples represent the scope of available access defined by the policy queries. When users attempt to access the database with queries at runtime (referred to as a runtime queries), the system extracts runtime tools from the runtime queries and the runtime tuples are compared to the policy tuples. Runtime queries with runtime tuples within the scopes of corresponding policy tuples are executed. Attacks against the database are thereby thwarted from accessing the database outside the scope of the policy defined by the policy queries and represented by the policy tuples.

Figure 1:
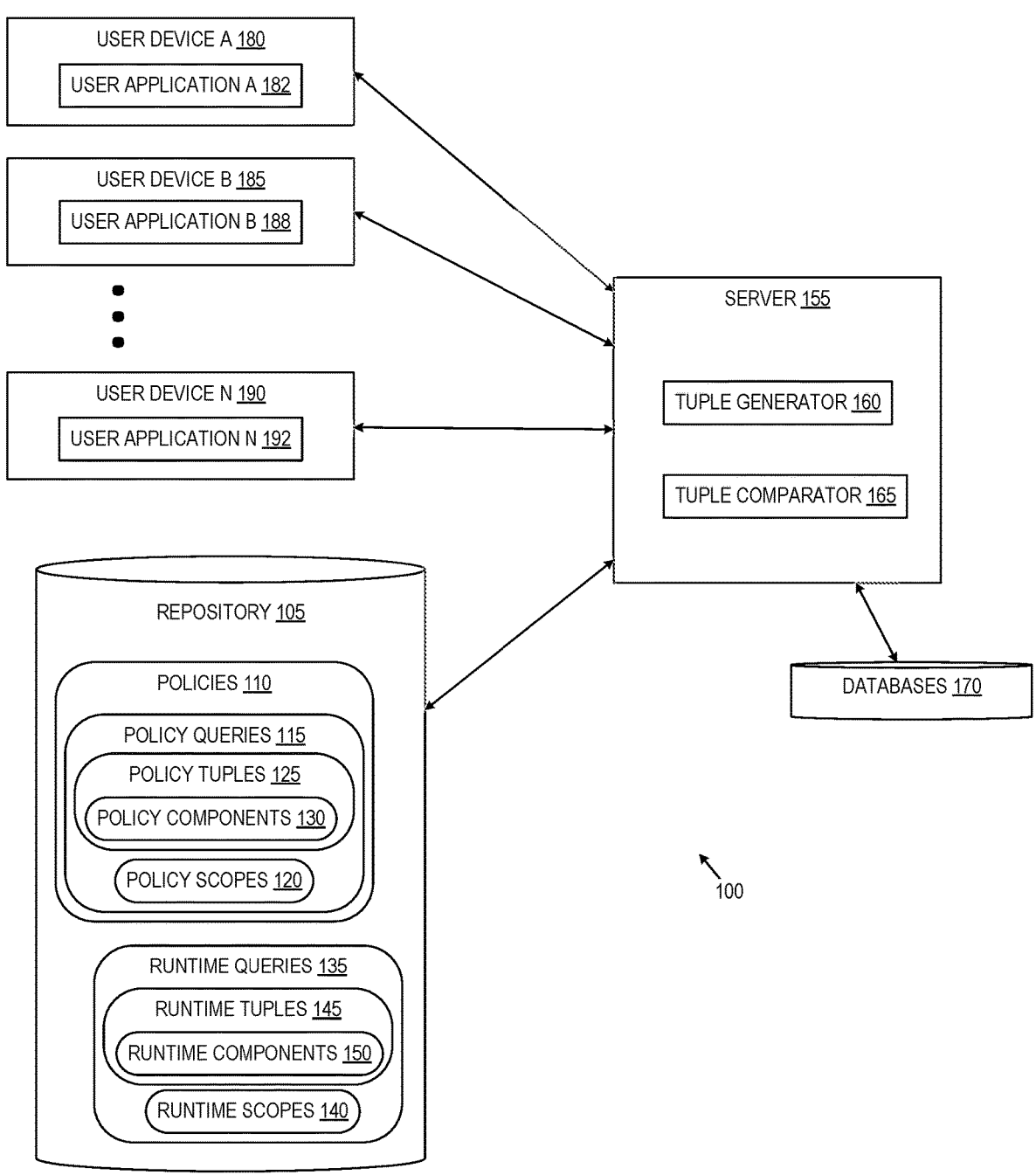
FIG. 1 shows a computing system, in accordance with one or more embodiments of the disclosure.

Turning to FIG. 1, the system (100) is a computing system shown in accordance with one or more embodiments. The system (100) and corresponding components may utilize the computing systems described in FIGS. 8A and 8B to compositional reasoning of information flow to secure access to the databases (170). Different architectures may be used. The system (100) includes the repository (105), the server (155), the databases (170), and the user devices A (180) and B (185) through N (190).

The repository (105) is a type of storage unit and/or device (e.g., a file system, database, data structure, or any other storage mechanism) for storing data. The repository (105) may include multiple different, potentially heterogeneous, storage units and/or devices. The repository (105) stores data utilized by other components of the system (100), including the server (155). The data stored by the repository (105) includes the policies (110), and the runtime queries (135).

The policies (110) are used by the system (100) to gate access to the databases (170). The policies (110) encompass various guidelines and rules that govern how the databases (170) are managed, accessed, and maintained. Implementing the policies (110) increases data security, integrity, and proper usage. The policies (110) may cover a wide range of areas, including data privacy, access controls, data retention, disaster recovery, and more. The policies (110) may vary based on the specific organization, industry, and regulatory requirements. The policies (110) are defined by the policy queries (115). One of the policies (110) may be defined by multiple ones of the policy queries (115). In one embodiment, one of the policies (110) may be a file that includes, references, or identifies a set of the policy queries (115).

The policy queries (115) are queries for the databases (170) that are used to enumerate the access limits to the databases (170) for the policies (110). In one embodiment, a policy query may be a string of text written in a structured query language (SQL) and stored within a file. The policy queries (115) define the policy scopes (120). In one embodiment, a set of the policy queries (115) may define one of the policy scopes (120) for one of the policies (110).

The policy tuples (125) are tuples extracted from the policy queries (115) that define the policy scopes (120) and include the policy components (130). A policy tuple may include several policy components.

The policy components (130) identify the columns of data that may be accessed in the databases (170), as well as the syntactic structures and functions that may be used to access manipulate the data. One of the policy tuples (125) may include a set of the policy components (130). For example, one of the policy tuples (125) may include a disclosed component, an accessed component, a syntactic component, a function component, an alias component, etc., of the policy components (130).

A disclosed component of a tuple extracted from a query may identify a set of disclosed columns to access from the databases (170). In one embodiment, the disclosed columns are the columns that are identified in the query using a SELECT statement. The disclosed columns are the columns whose values will be retrieved and provided in the result of a query.

An accessed component of a tuple extracted from a query may identify data within a set of disclosed columns to access from the databases (170). The accessed columns may include the columns that are involved in the query, including columns used in conditions, joins, and calculations. The accessed columns may be displayed in the query result and may be used to filter, group, or manipulate the data displayed in the result of a query.

A syntactic component of a tuple extracted from a query may identify syntactic constructs within a query that are used to identify or process data from a set of disclosed columns. A syntactic construct is a statement written using a grammar and structure of the query language that may define how the various elements of the query should be arranged to communicate with the database and retrieve or manipulate data. A syntactic component may identify a subset of statements or clauses available in a query language. Examples of syntactic constructs identified by a syntactic component include the following statements and clauses.

FROM clause: specifies the table(s) from which data is retrieved. May be used as part of a SELECT statement.

WHERE clause: used to filter results based on specified conditions and may follow the FROM clause and precede the GROUP BY or ORDER BY clauses if present.

GROUP BY clause: used to group rows that have the same values in specified columns into summary rows, and may be used with aggregate functions like COUNT, SUM, AVG, etc.

HAVING clause: works in conjunction with GROUP BY and filters group results based on aggregate function results.

ORDER BY clause: specifies the order in which the query results should be presented and may follow the SELECT and FROM clauses.

A function component of a tuple extracted from a query may identify functions to be applied to data from a set of disclosed columns. A function is a predefined operation that can be applied to data in a database to perform calculations, transformations, manipulations, etc., of the data. Functions for query languages may be used to retrieve, format, and manipulate data during the processing of queries. Functions may be categorized into the following types.

Scalar functions: operate on a single value and return a single value. Examples include:
UPPER( ) and LOWER( ): convert text to uppercase or lowercase.
LEN( ) or LENGTH( ): calculate the length of a string.
CONCAT( ) or ||: concatenate strings.
ROUND( ) and FLOOR( ): perform rounding or floor operations on numbers.
DATEPART( ), YEAR( ), MONTH( ), etc.: extract date or time components from date/time values.
Aggregate functions: operate on a group of values and return a single value
summarizing the group. May be used with the GROUP BY clause. Examples include:
COUNT( ): count the number of rows or non-null values in a column.
SUM( ): calculate the sum of values in a column.
AVG( ): calculate the average of values in a column.
MIN( ) and MAX( ): retrieve the minimum and maximum values in a column.
Date and time functions: manipulate and perform calculations with date and
time values. Examples include:
GETDATE( ), CURRENT_TIMESTAMP: get the current date and time.
DATEADD( ): add a specific interval to a date.
DATEDIFF( ): calculate the difference between two dates.
String functions: operate on string values. Examples include:
SUBSTRING( ): extract a portion of a string.
CHARINDEX( ) or INSTR( ): find the position of a substring within a string.
REPLACE( ): replace occurrences of a substring with another string.
Conversion functions: convert values from one data type to another. Examples include:
CAST( ) and CONVERT( ): convert data types.
TO_DATE( ), TO_NUMBER( ), etc.: convert strings to specific data types.
Logical Functions: these functions evaluate logical conditions and return a boolean result. Examples include:
IF( ), CASE: conditional expressions.
COALESCE( ): return the first non-null value in a list.

An alias component of a tuple extracted from a query may identify alias names (also referred to as aliases) for data or tables from the databases (170). Aliases provide temporary names to columns or tables in a query, making the output more readable and enabling the reference of columns or tables in a more concise manner. Aliases may be used with complex queries that involve multiple tables or calculations. For example, a column alias may identify a particular column from a set of disclosed columns and a table alias may be used to identify a table of data from a database.

The policy scopes (120) define the range of access to the databases (170) that are allowed by the policies (110). The policy scopes (120) are defined by the policy tuples (125) of the policy queries (115). A policy scope specifies the range of access to the databases (170) for one of the policies (110).

The runtime queries (135) are queries for the databases (170) that are used to access the databases (170) during the runtime of an application. The runtime queries (135) may be generated by the user devices A (180) and B (185) through N (190) and processed by the server (155).

The runtime tuples (145) are tuples generated from the runtime queries (135). The runtime tuples (145) may be generated from the runtime queries (135) in the same manner as the policy tuples (125) are generated from the policy queries (115) and include similar data and structures.

The runtime components (150) are components of the runtime tuples (145). The runtime components (150) of the runtime tuples (145) may include similar data and structures as with the policy components (130) of the policy tuples (125).

The runtime scopes (140) define the range of access to the databases (170) that are requested by the runtime queries (135). When a runtime scope for a runtime query is within the policy scope of a corresponding policy, the runtime query made the executed.

Continuing with FIG. 1, the system (100) also may include the server (155). The server (155) is one or more computing systems, possibly in a distributed computing environment. An example of the server (155) may be the computing system shown in FIG. 8A.

The server (155) may host and/or execute one or more processes, software, applications, etc. For example, the server (155) may execute the tuple generator (160) and the tuple comparator (165) as part of an application. Different embodiments may execute the tuple generator (160) and the tuple comparator (165) using different computing systems and servers. The server (155) may interact with the user devices A (180) and B (185) through N (190) to generate, process, and display the results of runtime queries sent by the user devices A (180) and B (185) through N (190).

The tuple generator (160) is the hardware or software components of the server (155) that generate the policy tuples (125) and the runtime tuples (145). The tuple generator (160) processes the policy queries (115) to extract the policy tuples (125) and processes the runtime queries (135) to extract the runtime tuples (145).

The tuple comparator (165) is the hardware or software components of the server (155) that compare the policy tuples (125) to the runtime tuples (145). In one embodiment, the tuple comparator (165) forms access determinations that identify whether the runtime scopes (140) are within the policy scopes (120) by comparing the runtime tuples (145) to the policy tuples (125).

The databases (170) are computing systems that provide access to structured collections of data. Access to the databases (170) is gated by the server (155) and the policies (110). The databases (170) include data that may be accessed by the user devices A (180) and B (185) through N (190) subject to the policies (110).

Continuing with FIG. 1, the user devices A (180) and B (185) through N (190) may interact with the server (155) to access the databases (170). The user devices A (180) and B (185) through N (190) may be computing systems in accordance with FIGS. 8A and 8B. The user devices A (180) and B (185) through N (190) may include and execute the user applications A (182) and B (188) through N (192).

In one embodiment, the user device N (190) is operated by an administrative user to gate access the databases (170) with one of the policies (110). In response to providing a set of the policy queries (115) with the user device N (190), the system (100) generates corresponding policy tuples, policy components, which form a policy scope for a policy defining the range of access to the databases (170).

In one embodiment, the user device A (180) is operated by a user to access the databases (170) using one of the runtime queries (135) in accordance with one of the policies (110). After comparing the runtime scope of the runtime query to the policy scope of the policy and determining that the runtime scope is within the policy scope, the runtime query made the executed. Execution of the runtime query generates results that may be displayed by the user device A (180) through the user application A (182).

Although described within the context of a client server environment with servers and user devices, aspects of the disclosure may be practiced with a single computing system and application. For example, a monolithic application may operate on a computing system to perform the same functions as one or more of the user application A (182), the tuple generator (160), and the tuple comparator (165).

Turning to FIG. 2, the process (200) uses compositional reasoning of information flow to secure access to databases. The process (200) may be performed using components from the systems of FIG. 1 and FIGS. 8A and 8B.

Step 202 of the process (200) includes gating access to a database using a policy having a policy scope defined by a set of policy tuples extracted from a set of policy queries. In one embodiment, access to the database is gated by setting up the policy that limits the range of access available to the database to the range defined by the policy scope. The policy may be set up by providing a set of policy queries which the policy tuples are extracted.

Step 205 of the process (200) includes preventing execution of a runtime query requesting access to the database. In one embodiment, execution is prevented by storing the runtime query without executing the statements and instructions specified within the runtime query.

Step 208 of the process (200) includes extracting a set of runtime tuples from the runtime query. A runtime tuple may include one or more of a disclosed component, an accessed component, a syntactic component, a function component, and an alias component.

Step 210 of the process (200) includes comparing the set of runtime tuples to the set of policy tuples to form an access determination identifying a runtime scope of the runtime query being within the policy scope of the policy. In one embodiment, the runtime components are compared to the policy components of the policy tuples. When a runtime component is outside of the scope defined by similar policy components, the access determination may indicate that the runtime scope of the runtime query is outside the policy scope of the policy.

Step 212 of the process (200) includes executing the runtime query in response to the access determination. When the runtime scope is within the policy scope, the runtime query may be executed to generate a result that is returned as a response to the runtime query. When the runtime scope is outside of the policy scope, the runtime query will not be executed, and it may be deleted.

In one embodiment, gating access to the database includes extracting a set of policy tuples from the set of policy queries to form the policy including the policy scope. For example, an administrator may provide multiple policy queries to define the policy scope. Each of the policy queries may be processed to generate multiple policy tuples and each of the policy tuples may include multiple policy components. The combined set of the policy components of the policy tuples extracted from the multiple policy queries define the policy scope for a policy.

In one embodiment, extracting the set of runtime tuples includes identifying a set of disclosed columns referenced by the runtime query and represented by a disclosed component of the runtime tuple. In one embodiment, the disclosed columns are the columns that are identified in the runtime query using a SELECT statement.

In one embodiment, extracting the set of runtime tuples includes identifying a set of accessed columns referenced by the runtime query and represented by the accessed component of the runtime tuple. The accessed columns may include the columns that are involved in the runtime query, including columns used in conditions, joins, and calculations to manipulate a result of the runtime query.

In one embodiment, extracting the set of runtime tuples includes identifying a set of syntactic constructs in the runtime query and represented by a syntactic component of the runtime tuple. The syntactic constructs within the runtime query are used to identify or process data from a set of disclosed columns.

In one embodiment, extracting the set of runtime tuples includes identifying a set of functions in the runtime query represented by the function component of the runtime tuple. The functions are operations and calculations to be applied to data from a set of disclosed columns.

In one embodiment, extracting the set of runtime tuples includes identifying a set of alias names in the runtime query represented by the alias component of the runtime tuple. The alias names (also referred to as aliases) for data or tables from the databases, In one embodiment, extracting the set of runtime tuples includes parsing the runtime query to generate a syntax tree. The syntax tree (also referred to as an abstract syntax tree (AST)), is a hierarchical representation of the syntactic structure of the runtime query. The syntax tree breaks down the query into smaller elements. The syntax tree captures the relationships between different parts of the query, including relationships between keywords, identifiers, operators, expressions, etc.

In one embodiment, extracting the set of runtime tuples includes computing an alias table from a syntax tree parsed from the runtime query. The alias table is a collection of aliases used in the runtime query to refer to columns or tables retrieved or constructed from a database.

In one embodiment, extracting the set of runtime tuples includes decomposing a syntax tree with an alias table to form an ordered list of operations. In one embodiment, the order of the ordered list puts the innermost statements from the runtime query at one side of the list (e.g., at the end or right side of the list) for subsequent processing.

In one embodiment, extracting the set of runtime tuples includes folding the ordered list of operations to form the runtime tuple. For example, the command "foldr" may be used to process elements of the list "from the right" (or from the tail) (representing the inner most portion of the runtime query) to pull the alias names from the text string of the runtime query into the alias component of a runtime tuple.

Figure 3A:
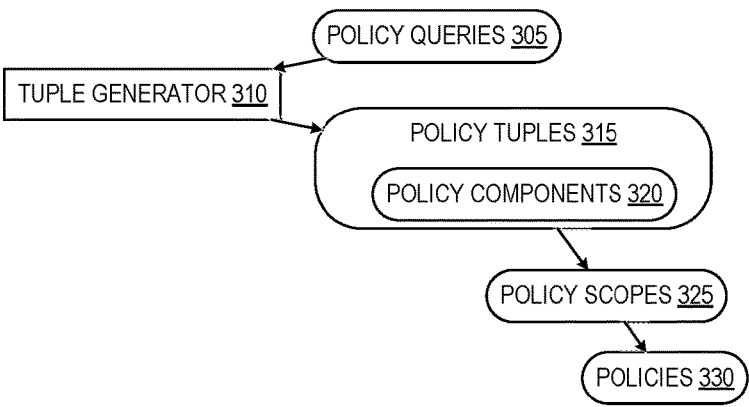
Figure 3B:
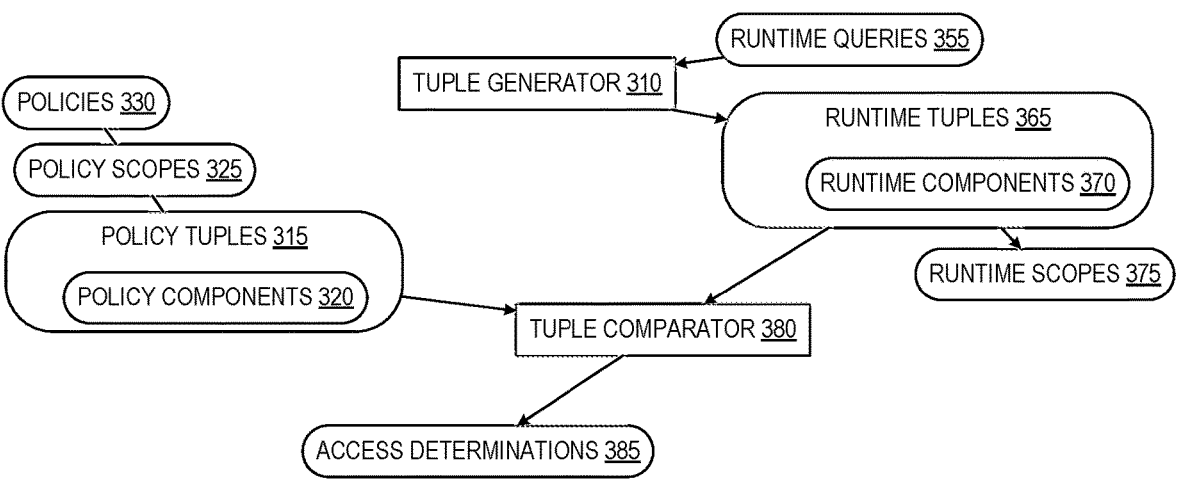

FIG. 3A and FIG. 3B illustrate data flow diagrams for protecting databases using compositional reasoning of information flow. In the example of FIGS. 3A and 3B, administrator Alice finds out that the nefarious hacker Hector is planning to instigate injection attacks against the databases of the system administrated by administrator Alice.

Turning to FIG. 3A, administrator Alice provides the policy queries (305) to limit access to the databases of the system. In response to receiving the policy queries (305), the system automatically utilizes the tuple generator (310) to process the policy queries (305) to extract the policy tuples (315). The policy tuples (315) include the policy components (320) that define the policy scopes (325) for the policies (330). The system may automatically update to use the policies (330) to gate access from runtime queries to the databases of the system.

Turning to FIG. 3B, the system receives the runtime queries (355) from multiple user devices, some of which may be controlled by hacker Hector. The system processes the runtime queries (355) with the tuple generator (310) to generate the runtime tuples (365). The software and algorithms used to generate the runtime tuples (365) from the runtime queries (355) may be the same software and algorithms used to generate the policy tuples (315) from the policy queries (305) of FIG. 3A. The runtime tuples (365) include the runtime components (370) that define the runtime scopes (375) for the runtime queries (355).

After generating the runtime scopes (375), the tuple comparator (380) compares the runtime tuples (365) to the policy tuples (315) to formulate the access determinations (385). In one embodiment, one access determination corresponds to one runtime query. The access determinations (385) identify whether the runtime scopes (375) of the runtime queries (355) are within the policies (330). In this case, the access determinations (385) indicate the runtime queries (355) sent by hacker Hector have runtime scopes that are outside the policies (330) generated from the policy queries (305) (of FIG. 3A) that were provided by administrator Alice. The malicious queries from hacker Hector within the runtime queries (355) are not executed, and the system is saved.

FIGS. 4A through 6 depict examples of queries from which tuples are extracted. The tuples may be policy tuples or runtime tuples.

The semantics for the tuples use a many-sorted structure. A set of atomic types are used that can be combined to form different types. A type structure is used with the form $T_1 \times T_2 \times \ldots T_n$ where each $T_i$ is a type. A formal type system is not developed and the type structure is referred as an n-tuple. The information flow semantics is represented as a collection of values over $\langle \varphi_1, \varphi_2, \ldots \varphi_n \rangle$.

A set of column names is referred to as Col and set of predicates is referred to as P. The predicates may refer to column names as well as constants. The sets A (also referred to as an accessed component of the n-tuple) and D (also referred to as a disclosed component of the n-tuple) represent columns that are accessed and disclosed in association with the predicates that permit the access or disclosure. Formally, the sets A and D are subsets of Col×P. If $c_1$ and $c_2$ are column names and $p_1$ and $p_2$ are predicates, $\langle c_1, p_2 \rangle$ represents that column $c_1$ may either be accessed or disclosed if predicate $p_2$ holds. Some of the components are constraints expressed over a suitable logic.

The semantics used by the system may overcome issues related to overgeneralization, which can lead to incorrectly analyzing a query, and issues related to setting up an infrastructure so as to enable support for different constructs in an incremental fashion. Embodied systems may not model exact runtime semantics but may be "semantic preserving" when considered from the runtime protection or information-flow perspective. The model may be viewed as a form of abstract compositional semantics that incorporates some structural information to accommodate information that is not easy to obtain or analyze at runtime. An example of this, is the semantics of stored procedures. The exact definition of the stored procedure and its semantics is not available at the application. Hence, the semantics may be approximated via structural information.

The semantics may be viewed as breaking down the information flow into two dimensions. The first dimension is the column-abstraction (i.e., which columns are accessed or disclosed) and the second dimension is the row-abstraction (i.e., which rows of the columns identified in the first part are accessed or disclosed).

While the use of the technique is at runtime, static analysis is performed on the query detected at runtime. The analysis may be viewed as type inference based on a structural type system extended with logical predicates that are used for the row-abstractions. The type inference may be similar to dependent or liquid (logically qualified data types) types.

The notation here may be used to represent mathematical relations. For notational convenience, the relational style representation is used, namely, $r::\varphi_1 \times \ldots \varphi_j \rightarrow \mathcal{P}$ $(\varphi_{j+1} \times \ldots \varphi_n)$ where $\mathcal{P}$ represents the power-set operation. The relation r takes j "parameters" and returns a set of n-j tuples.

For each syntactic construct S, $[\![ S ]\!]$ is defined as representing its information flow semantics. For a compositional approach, what is desired is captured by $[\![ S_1 \text{ op } S_2 ]\!] =$ $[\![ S_1 ]\!] \oplus_{op} [\![ S_2 ]\!]$ that may hold for syntactic constructs. Here op represents the syntactic construct that combines two statements (e.g., nested queries, UNION) and $\oplus_{op}$ represents its semantic counterpart.

Furthermore, $\oplus_{op}$ distributes over each of the components of the n-tuples as shown below. In other words, $\oplus_{op}$ has n independent operators that work individually on each of the values in the semantics. Formulaically:

$$\langle \varphi_1, \varphi_2, \ldots \varphi_n \rangle \oplus_{op} \langle \varphi_1', \varphi_2', \ldots \varphi_n' \rangle = \langle \varphi_1 \oplus_{op}^1 \varphi_1', \varphi_2 \oplus_{op}^2 \varphi_2', \ldots \varphi_n \oplus_{op}^n \varphi_n' \rangle$$

For the n-tuples to be used for runtime enforcement of allowlists, a sub-type relation is included. If the type of input query (referred to as $q_r$) is a subtype of the allowlist query (referred to as at), the input query may be permitted. The n-tuples represent different aspects of the semantics and the sub-type relation is defined in a point-wise fashion. For each field there is a sub-type relation defined (say denoted by $\leq_i$). We can then define $\langle \varphi_1, \ldots \varphi_n \rangle \leq \langle \varphi'_1, \ldots \varphi'_n \rangle$ iff for every i $\varphi i \leq_i \varphi'i$.

For the examples, a 5-tuple semantics is represented as ⟨ D, A, S, F, N⟩

The sets D and A are the sets of disclosed and accessed columns qualified with predicates respectively as stated earlier.

The set S captures the impact on the information flow of a set of certain syntactic constructs such as DISTINCT, ORDER BY, or GROUP BY. Constructs from the set result in implicit information flow and affect computed rows rather than columns (including order and grouping of returned rows). I.e., syntactic constructs that affect columns, such as JOIN or UNION do not fall into the category of the set of certain constructs. To capture implicit information flow, a set of types is associated with the set of constructs from S. For simplicity, the construct ORDER BY x is represented as orderBy({x}).

The set F represents the functions/procedures that appear in the queries.

The set N (for alias name) represents the alias table.

The semantics of a given query is a set of the 5 tuples described above. For complex examples, this is presented as functions of the form D→A×S×F×N.

The subtype relation for D and A are the same. The pair ⟨ s, p⟩ is used to denote the columns are accessed or disclosed. ⟨ s, p⟩ $\leq_D$⟨ s', p'⟩ iff (s⊆s')∧(p⇒p'). In other words, the set of the disclosed columns in the lower type is a subset of the set of the disclosed columns in the higher type and the predicate in the lower type implies the predicate in the upper type.

For the set of certain constructs, the values/expressions with the parameters are ordered. With the ordering, orderBy (x)$\leq_{ob}$ orderBy(y) iff x ⊂ y is defined. The relation for other items is defined in a similar fashion.

The set of functions/procedures may also be ordered by the subset relation. The ordering may also be manually defined. For example, if the allowlist has the function COUNT, not having the function COUNT in the incoming query will result in more values being released. In this case the subtype relation {COUNT} $\leq_F \emptyset$ will hold.

There is no requirement on the alias table as the two queries may be syntactically different. Since D and A use the actual column names, the alias table may be useful in the compositional construction process and not be used to determine the subtypes.

The examples of queries of the FIGS. 4A through 6 use the following schema.

CREATE TABLE X (x int, x1 int, x2 int, x3 int);
CREATE TABLE Y (y int, y1 int, y2 int, y2 int);
CREATE TABLE Z (z int, z1 int, z2 int, z3 int);

Turning to FIG. 4A, the use of simple functions is demonstrated using the query (405), which is converted to the tuple (410). With the query (405) the disclosed columns are identified by the disclosed component ("{ ⟨ x, true⟩ }") and the accessed columns are identified by the accessed component ("{ ⟨ x1, x1>2⟩ }"). A change to the semantics is the use of the function COUNT which will be added to the set F (the function component). That is, F={COUNT}. The set S (the syntactic component) and the set N (the alias component) are empty (shown with "∅"). The overall semantics of the query (405) is thus given by the tuple (410), which is a 5-tuple.

If this F is part of the allow list, a query of the form SELECT AVG (x) FROM X WHERE x1>2 will be rejected as the function AVG is not permitted because it is not captured by the set F. In other words, the query using the AVG function is not permitted because the set F (i.e., the function component) does not include the AVG function.

Turning to FIG. 4B, the query (415) includes the LEFT JOIN construct and is converted to the tuples (420). The LEFT JOIN disclosure of x does not depend on the join condition and therefore the set A of accessed columns for x is empty "∅") in contrast to the set A of accessed columns for y ("{ ⟨ {x1, y1}, x1=y1⟩ }"). The scope of access is defined by the tuples (420), which includes two tuples extracted from a single query.

Turning to FIG. 4C, the query (425) includes the UNION construct and is converted to the tuples (430). For the query (425) the semantics of the two select statements are captured by tuples (425), which include the tuples "⟨ { ⟨ x, true⟩ }, { ⟨ x1, x1>2⟩ }, ∅, ∅, ∅⟩ " and "⟨ { ⟨ y, true⟩ }, { ⟨ y2, y2= 4⟩ }, ∅, ∅, ∅⟩ ". The semantics of UNION is the union of these tuples.

Turning to FIG. 5A, the query (505) includes a UNION construct in an expression and is converted to the tuples (510). The semantics of the inner two SELECT statement queries with the UNION construct is as before. However, that which is disclosed by these nested SELECT statement queries is not disclosed by the outer SELECT statement query. Hence, a demotion operator is used to change the disclosed items to the accessed items. When "$\langle\{\langle z, true\rangle\}, \{\langle z3, true\rangle\}, \emptyset, \emptyset, \emptyset\rangle$" is combined with (i.e., demoted because of the semantics of IN) "$\langle\{\langle x, true\rangle, \langle y, true\rangle\}, \{\langle x1, x1>2\rangle, \langle y2, y2=4\rangle\}, \emptyset, \emptyset, \emptyset\rangle$" yields the following components of the tuples (510), which are written in functional style. The disclosure components for both of the tuples (510) are "$\{\langle z, true\rangle\}$". The accessed components are "$\langle\{z3, x, x1\}, z3=x\wedge x1>2\rangle$" and "$\langle\{z3, y, y2\}, z3=y\wedge y2=4\rangle$". More formally, the semantics of the query can be given by the tuples (510) "$\langle\{\langle z, true\rangle\}, \{\langle\{z3, x, x1\}, z3=x\wedge x1>2\rangle\}, \emptyset, \emptyset, \emptyset\rangle$" and "$\langle\{\langle z, true\rangle\}, \{\langle\{z3, y, y2\}, z3=y\wedge y2=4\rangle\}, \emptyset, \emptyset, \emptyset\rangle$", which are 5-tuples.

By defining suitable operators for converting queries to tuples, complex queries may be generated in a compositional fashion. Here, the semantics of the inner SELECT statements are processed first and then updated when the outer SELECT statement is processed. The alias tables are empty although z3 can refer to x or y, which is related to semantics of IN and are not aliases from a context of the query language. Hence, z3 is not aliased to x or y.

Turning to FIG. 5B, the query (515) includes a correlated sub-query (a sub-query containing a reference to a table that appears in an outer query) that is converted to the tuple (520). In a first step the alias table N is constructed to identify columns used by the expression A.x2=A.y2. N is constructed compositionally by starting from the innermost query. It is identified that A.y2 refers to column Y.y2 (since Y is aliased by A) but leaves A.x2 unresolved (because no reference for column x2 can be found in table Y). Thus, N for the inner query is $\{\langle A, Y\rangle\}$. Then the outermost query is processed that aliases X by A and resolves A.x2 as X.x2. Thus, N for the outer query is $\{\langle A,X\rangle, \langle A.x2,X.x2\rangle\}$. The alias of the inner query can be dropped as A refers to X and not Y.

After identifying N (the alias component), the disclosure D (the disclosure component) is generated. As above the compositional approach starts with the innermost query that generates $\langle\{\langle y, true\rangle\}, \{\langle\{x2, y2\}, x2=y2\rangle\}, \emptyset, \emptyset, \{\langle A,X\rangle, \langle A.x2,X.x2\rangle\}\rangle$. Further, the outermost query is processed. This demotes disclosure of y and generates disclosure for x of "$\{\langle x, true\rangle\}$". The access component is "$\langle\{y, y2, x1, x2\}, x1=y\wedge x2=y2\rangle$". When combined, the semantics of the query (520) is given by the tuple "$\langle\{\langle x, true\rangle\}, \langle\{y, y2, x1, x2\}, x1=y\wedge x2=y2\rangle, \emptyset, \emptyset, \{\langle A, Y\rangle\}\rangle$".

Turning to FIG. 5C, the query (525) includes the term ORDER BY and is converted to the tuple (530). Here, again, the compositionality can be seen. The phrase SELECT x AS c FROM X is processed and then update the S-component when ORDER BY x2 is processed. While processing the query (525), the alias table is updated to map c to x. The semantics of the tuple (530) is given by "$\langle\{\langle x, true\rangle\}, \{\langle x2, true\rangle\}, orderBy(\{x2\}), \emptyset, \emptyset\rangle$".

Turning to FIG. 6, the query (605) is complex and is converted to the tuples (610). There are no predicates for the sake of simplicity. Here, a is aliased to x and b is aliased to y. This can be computed compositionally by starting in the innermost query and proceeding to the outermost. For instance, the innermost query aliases x by c and then c is aliased by a. The compositional analysis starts out with the nested queries where the ORDER BY x2 is noted.

The semantics of SELECT x AS c FROM X ORDER BY x2 is the 5-tuple "$\langle\{\langle x, true\rangle\}, \{\langle x2, true\rangle\}, orderBy(x2), \emptyset, \{\langle c, x\rangle\}\rangle$". That is, to disclose x, one has to access x and x2 and the values are ordered by the values from column x2.

The semantics of SELECT y AS d FROM Y is the 5 tuple "$\langle\{\langle y, true\rangle\}, \{\rangle y, true\rangle\}, \emptyset, \emptyset, \{\langle d, y\rangle\}\rangle$". No other column is accessed to disclose y.

Combining the above with the outer SELECT with the ORDER BY z1 gives that the alias table N is $\{\langle c, x\rangle, \langle a, c\rangle, \langle d, y\rangle, \langle b, d\rangle\}$, the disclosure of $\langle x, true\rangle$ has $\langle\{\langle\{x, x2, z1\}\}, true\rangle, orderBy(z1), \emptyset, N\rangle$, the disclosure of $\langle y, true\rangle$ has $\langle\{\langle\{y, z1\}, true\rangle\}, orderBy(z1), \emptyset, N\rangle$, and the disclosure of $\langle z, true\rangle$ has $\langle\{\langle\{z, z1\}, true\rangle\}, orderBy(z1), \emptyset, N\rangle$. Such semantics operators will be part of the INNER JOIN and ORDER BY constructs with the alias table being updated when the AS construct is processed.

Turning to FIG. 7, the process (700) shows the steps performed to convert a query to a tuple. The process (700) uses the "foldr" operation from a functional programming language (e.g., Haskell), by using the function semanticOps which maps the various syntactic operations into the semantic operations as shown by the various examples. Effectively, the implementation has a mapping for all the supported constructs for different versions of structured query languages, including Oracle® SQL and MySQL. Oracle® and MySQL are registered trademarks of Oracle and/or its affiliates.

Processing a query utilizes the semantic framework and the operators for the various syntactic constructs (e.g., access predicates for different types of joins, union of tuples for UNION, demotion when handling nested queries, updating S when processing ORDER BY etc.). Definition is done once for the relevant subset of structured query language queries. The processing of the queries has the steps of parsing and creating an abstract syntax tree (AST) at line 2 of the process (700) and then computing the aliasing information captured by the set N at line 3 of the process (700). The semantic analysis starts with the inner-most construct and works outwards by updating the semantics according to the syntactic compositions, as indicated by lines 5 and 6 of the process (700).

Figures 8A, 8B:
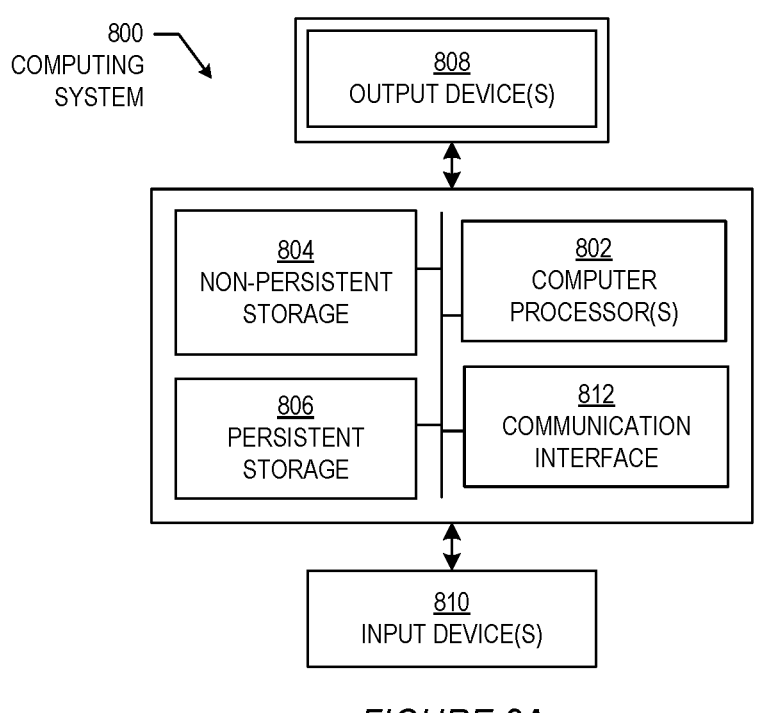
FIG. 8A and FIG. 8B show a computing system and network environment, in accordance with one or more embodiments of the disclosure.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processors (802), non-persistent storage device(s) (804), persistent storage device(s) (806), a communication interface (812) (e.g., Bluetooth interface, infrared interface, network interface, optical interface, etc.), and numerous other elements and functionalities that implement the features and elements of the disclosure. The computer processor(s) (802) may be an integrated circuit for processing instructions. The computer processor(s) may be one or more cores or micro-cores of a processor. The computer processor(s) (802) includes one or more processors. The one or more processors may include a central processing unit (CPU), a graphics processing unit (GPU), a tensor processing units (TPU), combinations thereof, etc.

The input devices (810) may include a touchscreen, keyboard, mouse, microphone, touchpad, electronic pen, or any other type of input device. The input devices (810) may receive inputs from a user that are responsive to data and messages presented by the output devices (808). The inputs may include text input, audio input, video input, etc., which may be processed and transmitted by the computing system (800) in accordance with the disclosure. The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the output devices (808) may include a display device, a printer, external storage, or any other output device. One or more of the output devices may be the same or different from the input device(s). The input and output device(s) may be locally or remotely connected to the computer processor(s) (802). Many different types of computing systems exist, and the aforementioned input and output device(s) may take other forms. The output devices (808) may display data and messages that are transmitted and received by the computing system (800). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (800) may be located at a remote location and connected to the other elements over a network.

The nodes (e.g., node X (822), node Y (824)) in the network (820) may be configured to provide services for a client device (826), including receiving requests and transmitting responses to the client device (826). For example, the nodes may be part of a cloud computing system. The client device (826) may be a computing system, such as the computing system shown in FIG. 8A. Further, the client device (826) may include and/or perform all or a portion of one or more embodiments.

The computing system of FIG. 8A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

gating access to a database using a policy comprising a policy scope comprising a set of policy tuples extracted from a set of policy queries;

preventing execution of a runtime query requesting access to the database by not executing the runtime query;

extracting a set of runtime tuples from the runtime query, wherein the set of runtime tuples comprises a runtime tuple comprising a disclosed component and an accessible component, and wherein the runtime tuple further comprises a syntactic component, a function component, and an alias component;

comparing the set of runtime tuples to the set of policy tuples to form an access determination identifying a runtime scope of the runtime query comprised by the policy scope of the policy; and executing the runtime query in response to the access determination.

2. The method of claim 1, wherein gating access to the database comprises:

extracting a set of policy tuples from the set of policy queries to form the policy comprising the policy scope.

3. The method of claim 1, wherein extracting the set of runtime tuples comprises:

identifying a set of disclosed columns referenced by the runtime query and represented by a disclosed component of a runtime tuple of the set of runtime tuples, wherein the set of disclosed columns comprises a disclosed column selected by the runtime query.

4. The method of claim 1, wherein extracting the set of runtime tuples comprises:

identifying a set of accessible columns referenced by the runtime query and represented by the accessible component of a runtime tuple of the set of runtime tuples, wherein the set of accessible columns comprises an access column used to manipulate a result of the runtime query.

5. The method of claim 1, wherein extracting the set of runtime tuples comprises:

identifying a set of syntactic constructs in the runtime query and represented by a syntactic component of a runtime tuple of the set of runtime tuples, wherein the set of syntactic constructs comprises a syntactic construct used to manipulate a result of the runtime query.

6. The method of claim 1, wherein extracting the set of runtime tuples comprises:

identifying a set of functions in the runtime query represented by a function component of a runtime tuple of the set of runtime tuples, wherein the set of functions comprises a function to be applied to data for a result from the runtime query.

7. The method of claim 1, wherein extracting the set of runtime tuples comprises:

identifying a set of alias names in the runtime query represented by an alias component of a runtime tuple of the set of runtime tuples, wherein the set of functions comprises a function to be applied to data for a result from the runtime query.

8. The method of claim 1, wherein extracting the set of runtime tuples comprises:

parsing the runtime query to generate a syntax tree.

9. The method of claim 1, wherein extracting the set of runtime tuples comprises:

computing an alias table from a syntax tree parsed from the runtime query;

decomposing the syntax tree with the alias table to form an ordered list of operations; and folding the ordered list of operations to form a runtime tuple of the set of runtime tuples.

10. A system comprising:

at least one processor;

an application executing on the at least one processor to perform:

gating access to a database using a policy comprising a policy scope comprising a set of policy tuples extracted from a set of policy queries;

preventing execution of a runtime query requesting access to the database by not executing the runtime query;

extracting a set of runtime tuples from the runtime query, wherein the set of runtime tuples comprises a runtime tuple comprising a disclosed component and an accessible component, and wherein the runtime tuple further comprises a syntactic component, a function component, and an alias component;

comparing the set of runtime tuples to the set of policy tuples to form an access determination identifying a runtime scope of the runtime query comprised by the policy scope of the policy; and executing the runtime query in response to the access determination.

11. The system of claim 10, wherein gating access to the database comprises:

extracting a set of policy tuples from the set of policy queries to form the policy comprising the policy scope.

12. The system of claim 10, wherein extracting the set of runtime tuples comprises:

identifying a set of disclosed columns referenced by the runtime query and represented by a disclosed component of a runtime tuple of the set of runtime tuples, wherein the set of disclosed columns comprises a disclosed column selected by the runtime query.

13. The system of claim 10, wherein extracting the set of runtime tuples comprises:

identifying a set of accessible columns referenced by the runtime query and represented by the accessible component of a runtime tuple of the set of runtime tuples, wherein the set of accessible columns comprises an access column used to manipulate a result of the runtime query.

14. The system of claim 10, wherein extracting the set of runtime tuples comprises:

identifying a set of syntactic constructs in the runtime query and represented by a syntactic component of a runtime tuple of the set of runtime tuples, wherein the set of syntactic constructs comprises a syntactic construct used to manipulate a result of the runtime query.

15. The system of claim 10, wherein extracting the set of runtime tuples comprises:

identifying a set of functions in the runtime query represented by a function component of a runtime tuple of the set of runtime tuples, wherein the set of functions comprises a function to be applied to data for a result from the runtime query.

16. The system of claim 10, wherein extracting the set of runtime tuples comprises:

identifying a set of alias names in the runtime query represented by an alias component of a runtime tuple of the set of runtime tuples, wherein the set of functions comprises a function to be applied to data for a result from the runtime query.

17. The system of claim 10, wherein extracting the set of runtime tuples comprises:

parsing the runtime query to generate a syntax tree;

computing an alias table from the syntax tree parsed from the runtime query;

decomposing a syntax tree with the alias table to form an ordered list of operations; and folding the ordered list of operations to form a runtime tuple of the set of runtime tuples.

18. A non-transitory computer readable storage medium storing computer readable program code which, when executed by a processor, performs:

gating access to a database using a policy comprising a policy scope comprising a set of policy tuples extracted from a set of policy queries;

preventing execution of a runtime query requesting access to the database by not executing the runtime query; 5 extracting a set of runtime tuples from the runtime query, wherein the set of runtime tuples comprises a runtime tuple comprising a disclosed component and an accessible component, and wherein the runtime tuple further comprises a syntactic 10 component, a function component, and an alias component;

comparing the set of runtime tuples to the set of policy tuples to form an access determination identifying a runtime scope of the runtime query comprised by the 15 policy scope of the policy; and executing the runtime query in response to the access determination.

\*    \*    \*    \*    \*